United States Patent [19]

Jaeggi et al.

[11] 4,001,437
[45] Jan. 4, 1977

[54] PROCESS FOR MAKING AND FLAVORANTS FROM MILK PRODUCTS AND COMPOSITIONS CONTAINING SAME

[75] Inventors: Kurt Jaeggi, Dubendorf; Victor Krasnobajew, Zollikerberg; Peter Weber, Greifensee; Jost Wild, Uster, all of Switzerland

[73] Assignee: Givaudan Corporation, Clifton, N.J.

[22] Filed: Dec. 5, 1973

[21] Appl. No.: 422,034

[30] Foreign Application Priority Data

Dec. 18, 1972  Switzerland .................... 18494/72
Oct. 16, 1973  Switzerland .................... 14660/73

[52] U.S. Cl. .................... 426/34; 426/41; 426/42; 426/43; 426/533
[51] Int. Cl.² .................... A23L 1/23; A23L 1/231
[58] Field of Search ............ 426/65, 41, 42, 43, 426/38, 34, 533

[56] References Cited

UNITED STATES PATENTS

| 2,835,593 | 5/1958 | Rusoff ............................. 426/65 X |
| 3,466,176 | 9/1969 | Bundres et al. ................. 426/65 X |
| 3,674,508 | 7/1972 | Kasik et al. ..................... 426/65 X |

*Primary Examiner*—A. Louis Monacell
*Assistant Examiner*—Esther L. Massung
*Attorney, Agent, or Firm*—Thomas Cifelli, Jr.

[57] ABSTRACT

Process for making flavorants by heating a liquid product obtained from milk products by enzymatic proteolysis and/or lactic acid fermentation.

17 Claims, No Drawings

PROCESS FOR MAKING AND FLAVORANTS FROM MILK PRODUCTS AND COMPOSITIONS CONTAINING SAME

FIELD OF THE INVENTION

This invention relates to the field of aroma substances or flavorants.

SUMMARY OF THE INVENTION

The present invention relates to aroma substances, also sometimes referred to as flavorants herein. More particularly, the invention is concerned with a process for the manufacture of aroma substances, with flavoring compositions containing said aroma substances or said flavoring compositions and with a method for the aromatisation of foodstuffs and beverages by means of said aroma substances or said flavoring compositions.

According to the present invention, aroma substances are manufactured by heating a liquid product, obtained from carbohydrate-containing milk products by enzymatic proteolysis and/or by lactic acid fermentation. If desired, the heating can be carried out in the presence of cysteine.

DESCRIPTION OF THE PREFERRED EMBODIMENTS

Examples of carbohydrate-containing milk products which can be converted in accordance with the present invention into aroma substances after enzymatic proteolysis and/or lactic acid fermentation has been effected are, especially, full-cream milk, skim milk, skim milk powder, buttermilk, milk concentrate, whey, whey powder, yoghurt, yoghurt powder, etc. Yoghurt and yoghurt powder are especially suitable. The aforementioned pre-treatment of the milk product, that is to say, the proteolysis and/or lactic acid fermentation, serves to degrade the proteins (e.g., casein, albumin, globulin, etc.) and/or the carbohydrates (e.g., lactose), thereby providing starting materials which are needed for the process, namely, inter alia, sugar or sugar degradation products and amino acids. The method by which the pre-treatment is carried out is governed by the choice of the milk product.

The liquid product obtained after the pre-treatment is denoted hereinafter, for simplicity, as BTMP which is an abbreviation for "biologically treated milk product".

In the following Table the method of pre-treatment is given for the principle milk products:

Table

| Milk product | Pre-treatment |
| --- | --- |
| Full-cream milk | Proteolysis, Lactic acid fermentation |
| Skim milk | Proteolysis, Lactic acid fermentation |
| Whey | Proteolysis, Lactic acid fermentation |
| Yoghurt | Proteolysis |
| Buttermilk | Proteolysis, Lactic acid fermentation |

In connection with the foregoing compilation, there are preferably used as the starting materials in the process those liquid products which are obtained from milk products which have been subjected to an enzymatic proteolysis and a lactic acid fermentation.

The enzymatic proteolysis can be carried out using the usual proteolytically active enzymes or by the action of the enzyme system of proteolytically active microorganisms, it being necessary, of course, in order to achieve useful results, to use microorganisms having a certain activity so that the proteolysis is completed after a relatively short time (e.g. after about 7 days). Suitable proteases which can be used are proteases of vegetable origin (e.g. ficin, bromelain and papain), of animal origin (e.g. trypsin and chymotrypsin) or of microbial origin (e.g. Rhozym from Rohm and Haas) which are capable of clarifying aqueous suspensions of milk products in a short time; that is to say, which are capable of degrading the milk proteins relatively quickly to peptides and amino acids. Especially suitable are proteases of microbial origin.

The suitable enzyme concentration can be readily determined by experiment and gives the clarification time which, for enonomic reasons, should not be too long. It should normally — determined by the conditions given in the following — not exceed 5-24 hours. The determination itself is carried out according to methods which are common in the dairy industry; for example, by measurement of the optical density. For this purpose, samples are withdrawn from the mixture at regular intervals, mixed with 15% trichloroacetic acid, the insoluble material centrifuged off and the optical density of the solution measured at 280 m$\mu$. If this has reached a value of ca 20/ml (after subtraction of the zero value), this is equated with clarification. The substrate concentrations can be quite high; for example, in the case of whey it lies at ca 5 to ca 20 wt.%, in yoghurt it lies at ca 20 to ca 50 wt.% and in skim milk it lies at ca 8 to ca 20 wt.%. The pH value of the medium preferably lies at ca 7, but it can also be carried out in weakly acidic media (e.g. at pH 4) or weakly alkaline media (e.g. at pH 7.5).

The suitable incubation temperature lies in the approximate range of from 30° to 60° C. When commercially available proteases are used, the proteolysis is generally completed after a few hours (e.g. 1 to 20 hours). The mixture is then neutralised (e.g. by means of sodium hydroxide), subjected to heat sterilisation (e.g. at 120° C — steam) and worked up (e.g. by spray-drying or lyophilisation).

If the proteolysis is carried out by the action of the enzyme system of microorganisms, there can be used the proteolytically highly-active, apathogenic species of *Bacillus* (e.g. *B. cereus, B. subtilis, B. licheniformis, B. megaterium* etc), *Pseudomonas* (e.g. *Ps. aeruginosa* etc), *Streptomyces* (e.g. *S. narensis, S. griseus, S. faecalis* etc), *Aspergillus* (e.g. *A. oryzae, A. Soyae, A. melleus* etc) or Basidiomycetes or yeasts (e.g. *Candida lipolytica, Rhodothorula glutinis* etc). Those species of the specified genera having the necessary activity, namely the capability of bringing about the proteolysis, can be determined by experiment. The species should clarify the aqueous suspension of the milk product to be proteolysed within a useful period of time (i.e. within a maximum of 7 days) under the conditions given hereinafter.

The suitable substrate concentration generally lies at ca 5 to ca 10 wt.%. In skim milk, for example, it amounts to ca 8 to ca 15 wt.%, in whey it amounts to ca 7 to ca 15 wt. % and in yoghurt it amounts to ca 10 to ca 15 wt.%.

The inoculum is preferably used in an amount of about 1–10% (v/v) of the growing culture based on the substrate. Suitable pH values are those given earlier. The suitable incubation temperature lies in the region of 30°–70° C. The duration of the proteolysis is approximately 1 day to a maximum of 7 days. From these values, it will be seen that the proteolysis carried out by means of proteases is clearly superior to the proteolysis carried out by means of microorganisms. The neutralisation, sterilisation and working-up of the mixture can be carried out as described earlier.

The lactic acid fermentation can be carried out using any of the bacteria which are suitable in the food industry for lactic acid fermentation. There can thus be used *Lactobacilli* (e.g. *L. casei*, *L. bulgaricus* etc) and *Streptococci* (e.g. *S. lactis* etc).

The lactic acid fermentation can be carried out according to the methods known per se; for example, by incubation of the milk product, which may be dissolved or suspended in water, at temperatures of 30°–45° C.

The substrate concentration expediently amounts to ca 5 to 20 wt.%, especially about 10 wt.%. The amount of the inoculum is expediently that given earlier. It is expedient that the pH value of the medium initially lies at the neutrality point, namely at approximately 6.5–7.5. The fermentation is generally terminated when the pH value in the medium amounts to ca 4.5. This normally takes ca 10 to 48 hours.

The working-up is carried out as described earlier.

According to an advantageous embodiment, the proteolysis by the action of proteases and the lactic acid fermentation are carried out simultaneously. In this case, protease and lactic acid bacteria are added simultaneously to a suspension of the carbohydrate-containing milk product and this is then incubated.

When proteolysis using microorganisms and lactic acid fermentation are carried out simultaneously, measures are preferably taken whereby the anaerobic lactic acid bacteria are added to the medium after the proteolysis has first been carried out and fermentation is then carried out without aeration.

As stated earlier, the three carbohydrate-containing milk products yoghurt, skim milk and whey are primarily suitable for the manufacture of the aroma substances in accordance with the present invention. Yoghurt powder is especially suitable since it is inexpensive and readily obtainable. Being a product of an already-completed lactic acid fermentation, yoghurt only needs to be subjected to proteolysis. This is preferably carried out by means of proteases. In addition, a yoghurt concentrate of up to 50 wt.% can be used. Of the aforementioned milk products, whey is the least suitable insofar as it is a protein-deficient product which firstly has to be enriched with other proteins (e.g. casein) or a vegetable protein (e.g. soya protein) up to the content of milk or even higher (e.g. to 3–6 wt.%).

In accordance with the present invention, the BTMP is then heated, if desired, in the presence of cysteine.

The BTMP is normally a yellowish to brownish powder in the dry form. It can be heated in the form of such a powder or in the form of a concentrate (e.g. a 50% concentrate in water).

The desired aroma is formed when the BTMP is heated at the temperatures customarily adopted in the known non-enzymatic browning reaction [Maillard-reaction, see, for example, Food Res. 25, (1960), 491–594]. For example, the heating can be carried out at temperatures of 90°–180° C, especially at about 110°–150° C. The heating time is normally inversely proportional to the temperature; it expediently amounts to about 15 minutes to 2 hours.

Cysteine can be used as such or in the form of derivatives or salts which form the free amino acid under the conditions of the process. Cysteine hydrochloride, for example, can be used in place of cysteine.

Apart from cysteine, other amino acids can be added to the BTMP; for example, small amounts of the well-known amino acids, peptides or related compounds present in meat such as alanine, arginine, cystine, proline, glycine, histidine, isoleucine, leucine, lysine, serine, threonine, valine and anserine.

There can also be added to the BTMP other ingredients such as sugars (e.g. pentoses such as arabinose and xylose), polyalcohols (e.g. tertiary alcohols such as glycerine or glycols such as propyleneglycol) or aroma intensifiers such as, for example, 0.1–200% monosodium glutamate, 0.1–100% disodium inosine-5'-monophosphate (IMP) and disodium guanosine-5-phosphate (GMP).

Finally, fats can also be added to the BTMP; for example, groundnut oil or special aroma substances such as butter or synthetic butter substitute.

The products obtainable in accordance with the foregoing process are highly concentrated aroma substances which can be diluted in a manner known per se or distributed in edible materials. They can be converted into the usual forms of use (i.e. the flavouring compositions provided by this invention) such as solutions, pastes or powders according to methods known per se. The products can be spray-dried, vacuum-dried or lyophilised. Examples of carrier materials which can be used to form such flavouring compositions are gum arabic, salts or brewer's yeast or similar adsorbants. Indoles, maltol, dienals, spice oleoresins or smoke aromas can also be added as flavour-improvers. The formulation of such flavouring compositions as well as the aromatising of foods can be carried out in a manner known per se (see J. Merory; Food flavorings, Composition, manufacture and use; Avi Publ. Co., Westport 1968).

The aforementioned flavouring compositions or aroma substances can be used for the aromatisation of numerous foods or beverages and it will be appreciated that the invention includes within its scope (a) a method for the aromatisation of foods or beverages which comprises adding such an aroma substance or flavouring composition to foods or beverages and (b) foods or beverages containing such an aroma substance or flavouring composition.

The following Table provides suitable concentration ranges for various flavouring compositions:

Table

|  | General | Preferred |
|---|---|---|
| Solutions | 1–100% | 10–60% |
| Pastes | 1–100% | 10–90% |
| Spray-dried powder | 3–60% | 15–35% |
| Lyophilised vacuum-dried powder | 2–30% | 8–18% |

With regard to the character of the flavour, the following can be said. When BTMP is heated in the absence of cysteine, or in the presence of only a small amount of cysteine, there is produced an aroma with the character of baked goods, especially with the character of bread, and can accordingly be used for the production or improvement of the flavour character of baked goods such as bread, bread rolls, milk bread, plaited buns, poppied bread rolls, panettons, biscuits, wafers, cookies, patisseries etc. The products treated in this manner have, without exception, a fuller, refined flavour.

In the production methods used today for bread or baked goods there exists a great need for the addition of flavour-improving substances for the following reasons. The yeast fermentation process has to be shortened for reasons of rational manufacture, baking may be effected at relatively low temperatures or at high temperatures for too short a time and the shelf-life has to be extended because of new distribution systems.

The deterioration of the flavour of fresh bread or baked goods resulting from these rationalisation measures can now be prevented in a determined manner by the addition of the flavouring compositions provided by the present invention. For this purpose, such compositions can, for example, be worked into the dough before the baking process. In so doing, the amounts of the composition used amount expediently to ca 0.1 to 5 wt.%.

When BTMP is heated in the presence of cysteine, there is produced an aroma having an intensive meat character. The products formulated according to the foregoing data can consequently be used for the aromatising of numerous foods and beverages; for example, meat-like products manufactured from natural or synthetic proteins as well as crisps, soups, sauces, crackers, wafer-fillings etc.

For the production of an intensive meat aroma, the ratio BTMP: cysteine should amount to about 4:1 to 3:1. If the ratio is higher (e.g. 8:1 to 10:1), the aroma of baked goods predominates.

The following properties of the meat aromas may be mentioned as being particularly advantageous. They make available more pronounced flavouring properties than previously known meat aromas (e.g. they are about 10 times stronger than synthetic meat aromas of the Maillard-type) which makes them especially perceptible in a pronounced aroma depth as a consequence of which they can be used in very small concentrations. They can be used in an oily form, by which means it is possible to homogeneously aromatise meat substitute substances such as, for example, soya proteins. Thus, for example, the latter can be aromatised very rationally in a spinning process.

The amount of an aroma substance of the present invention in an aromatised product can amount, for example, to about 0.05 to about 10%, preferably about 0.2 to 4%.

The following Examples illustrate the present invention:

EXAMPLE 1 a. Manufacture of pre-treated milk products: 10 liters of 10% sterilised skim milk (10% solids content) are incubated with a 24-hour culture of *Bacillus cereus* (isolated from milk) at 30° C for 24 hours in a shaking culture. After this time, the pH has risen from an original value of 6.3 to 7.5 and clarification has occurred; $O.D._{280\ nm}$= 20/ml. Then 1% (v/v) of a 48-hour *Lactobacillus casei* culture is added in order to ferment the lactose. The fermentation is carried out at 31° C without aeration and stirring and takes 3 days. The pH value of the solution now amounts to 4.5. The medium is subsequently brought to pH 7 by the addition of 6-N sodium hydroxide, sterilised at 120° C and lyophilised or spray-dried.

b. Instead of 10 liters of skim milk, 1 kg of skim milk powder can be added to 10 liters of water.

c. In the incubation of the skim milk or suspension of reconstituted skim milk powder with *Bacillus licheniformis*, the time necessary for clarification amounts to 7 days.

EXAMPLE 2 a. 1 liter of an enzyme solution containing 13 g of "Rhozym 41 conc." is added to 130 liters of sterilised or pasteurised 10% skim milk. The mixture is incubated with stirring at 31° C for 20 hours, after which time clarification of the milk occurs. Then, for the lactose fermentation, the mixture is fermented with 1.25 liters of a 48 hour old *Lactobacillus casei* pre-culture for 3 days at 31° C. At the end of the fermentation, the suspension is neutralised with concentrated sodium hydroxide, sterilised and spray-dried.

b. Proteolysis and lactic acid fermentation can advantageously be carried out simultaneously, which gives a time saving of ca 2 days. In this case, protease (Rhozym) and *Lactobacillus casei* are added simultaneously to the milk suspension and incubated at 31° C with stirring for 3 days. The working-up is carried out as described earlier.

EXAMPLE 3

600 g of casein are suspended with stirring in 10 liters of whey or 10 liters of reconstituted whey powder. The suspension is titrated to a pH value of 7 by the addition of 20% sodium hydroxide and treated as described in Example 2.

EXAMPLE 4

100 g of yoghurt powder are suspended in 500 ml of water, brought to a pH value of 7 with 6-N sodium hydroxide and 100 mg of Rhozym are introduced into the mixture with stirring.

The mixture is incubated for 16 hours at 45° C with stirring or shaking. In so doing, clarification of the yoghurt suspension occurs by proteolysis of the denatured casein as well as further milk proteins. The proteolysate is lyophilised or spray-dried. There is obtained a powder which is well-soluble in water.

EXAMPLE 5

An intimate mixture containing:

| | |
|---|---|
| BTMP from full-cream milk (spray-dried) | 270 g |
| L-cysteine hydrochloride | 85 g |
| D-xylose | 80 g |
| Ascorbic acid | 70 g |
| Sodium glutamate | 50 g |
| IMP | 25 g |
| GMP | 25 g |
| Glycerine | 1000 g | is heated with constant stirring to 120° C and held at this temperature for 80 minutes. The resulting product provides the strong aroma of roast beef. By dilution with hot water (0.5 g to 1 liter), a clear soup with a pronounced roast meat aroma is obtained.

EXAMPLE 6

An intimate mixture containing:

| | |
|---|---|
| BTMP from skim milk (spray-dried) | 400 g |
| Cysteine hydrochloride | 170 g |
| Ascorbic acid | 140 g |

-continued

| | |
|---|---|
| Xylose | 80 g |
| Sodium glutamate | 60 g |
| IMP | 30 g |
| GMP | 30 g |
| Water | 350 g | is warmed in a 2 liter autoclave to 130° C (12 atmospheres) and kept at this temperature for 1 hour. The aqueous product is spray-dried and gives a powder, the aroma of which is very similar to the aroma of the roast crust of wood-charcoal grilled steak.

EXAMPLE 7

An intimate mixture containing:

| | |
|---|---|
| Yoghurt powder proteolysate (spray-dried) | 700 g |
| HVP liquid (hydrolyzed vegetable proteins) | 500 g |
| Cysteine hydrochloride | 250 g |
| Sodium glutamate | 50 g |
| IMP | 50 g |
| GMP | 50 g | is heated in a 2 liter autoclave to 130° C (6–8 atmospheres) and held at this temperature for 1 hour. The product is spray-dried. The water-soluble powder has the flavour of beefsteak.

EXAMPLE 8

An intimate mixture of:

| | |
|---|---|
| Proteolysate from whey (spray-dried) supplemented with proteins (casein), 6% | 20 g |
| Cysteine hydrochloride | 10 g |
| Sodium glutamate | 5 g |
| IMP | 2.5 g |
| GMP | 2.5 g |
| Proline | 1 g |
| Methionine | 0.2 g |
| Water | 10 g | is heated with stirring in a pan to 300° C and held at this temperature for 6 minutes. The crusty, brittle product is dissolved from the pan with 30 ml of water and the solution is evaporated to dryness under a vacuum and the residue powdered. The powder has a pronounced roast beef flavour. It can therefore be used, for example, to confer the typical roast beef flavour to a purely synthetic, fibrous meat substitute in amounts of 0.2–4%.

EXAMPLE 9

An intimate mixture of:

| | |
|---|---|
| BTMP from milk concentrate (spray-dried) | 54 g |
| Cysteine hydrochloride | 17 g |
| Xylose | 16 g |
| Ascorbic acid | 14 g |
| Sodium glutamate | 10 g |
| IMP | 5 g |
| GMP | 5 g |
| Glycerine | 200 g |
| Oil (vegetable) | 479 g | is heated to 120° C and held at this temperature for 80 minutes. The oily phase is separated. When added to a soup in amounts of about 0.1%, it confers thereto a delicious flavour of roast chicken.

EXAMPLE 10

An intimate mixture of:

| | | |
|---|---|---|
| BTMP from full-cream milk (spray-dried) | 10 | g |
| Edible oil | 20 | ml |
| Ammonia (25% aqueous) | 10 | g |
| HVP liquid (hydrolyzed vegetable proteins) | 3 | g |
| Dihydroxyacetone | 3 | g |
| Methylamine (40% aqueous) | 2 | g |
| Thiamine hydrochloride | 1.5 | g |
| L-Leucine | 1 | g |
| Acetoin | 1 | g |
| Diacetyl | 1 | g | is heated to 120° C and held at this temperature for 30 minutes. The oily phase is separated. It can be worked into a moist bread dough in an amount of 0.2%. The thus aromatised bread tastes much fresher and, in particular, still has the fresh bread flavour after several days.

EXAMPLE 11 a. 10 g of spray-dried or lyophilised BTMP (from skim milk) are stirred to a paste with a 10 ml of water and heated to boiling on an oil-bath (130° C) with stirring. After the water has evaporated, there results a sticky mash to which 5 ml of vegetable oil or Miglyol 812 (polyclyceride) are added. The mixture is heated with stirring for 15 minutes to 120°–130° C, the product becoming strongly brown. After cooling, the mixture is homogenized to give an oily paste with a pleasant bread-crust aroma which is also reminiscent of roasted cheese.

b. If 3 g of L-cysteine are added to the water, there can be obtained a paste which has a strong meat aroma.

The term "foodstuff" is used herein, wherever the context so admits or requires, to include beverages.

What we claim is:

1. A process for the manufacture of substances having the flavor character of baked goods or meat, which process comprises heating to temperatures between 90° C. and 180° C. for 15 minutes to 2 hours a liquid product obtained from a member selected from the group consisting of full cream milk, skim milk, whey, yoghurt and buttermilk, by enzymatic proteolysis and lactic acid fermentation, said enzymatic proteolysis having been carried out for a time sufficient to clarify an aqueous suspension of said liquid product, using proteolytically active enzymes (proteases) of vegetable, animal or microbial origin which are capable of clarifying aqueous suspensions of said milk products in less than 24 hours in weakly acid, neutral or weakly basic aqueous media at temperatures between 30° and 60° C, and said lactic acid fermentation having been carried out using bacteria of the genus Lactobacilli or Streptococci in aqueous medium in a temperature range between 30° and 45° C up to a final pH of ca. 4,5 of the aqueous medium, with the proviso that yoghurt is subjected only to enzymatic proteolysis.

2. A process according to claim 1, wherein the heating is carried out in the presence of cysteine.

3. A process according to claim 2 wherein the ratio of said liquid product to cysteine amounts to 4:1 to 3:1 and the flavor character of the resulting substances is meaty.

4. A flavorant substance made in accordance with the process of claim 1.

5. A flavorant substance made in accordance with the process of claim 2.

6. A flavorant substance made in accordance with the process of claim 3.

7. A foodstuff containing an effective amount of the flavorant of claim 4 to cause aromatization of said foodstuff with a baked goods flavor.

8. A foodstuff containing an effective amount of the flavorant of claim 5 to cause aromatization of said foodstuff with a meat flavor.

9. A foodstuff containing an effective amount of the flavorant of claim 6 to cause aromatization of said foodstuff with a meat flavor.

10. A process according to claim 2, wherein the ratio of said liquid product to cysteine amounts to 8:1 to 10:1 and the flavor character of the resulting substance is that of baked goods.

11. A flavorant substance according to claim 6, wherein full-cream milk is said member and the substance has a pronounced roast meat character.

12. A flavorant substance according to claim 4, wherein full-cream milk is said member.

13. A flavorant substance according to claim 1, wherein skim milk is said member, and the substance has a bread-crust flavor reminiscent of roasted cheese.

14. A flavorant substance according to claim 6, wherein skim milk is the member and the substance has a strong meat aroma.

15. A flavorant substance according to claim 6, wherein skim milk is said member and the substance has a flavor of the roast crust of wood-charcoal grilled steak.

16. A flavorant substance according to claim 6, wherein yogurt powder is said member, and the substance has the flavor of beef steak.

17. A flavorant substance according to claim 6, wherein whey is the member and the substance has the flavor of roast beef.

* * * * *